United States Patent
Saurber, III et al.

(10) Patent No.: US 11,008,178 B1
(45) Date of Patent: May 18, 2021

(54) SYSTEM, APPARATUS, AND METHOD FOR DETECTING A FAULT IN A PUSHER SHOE OF A SHOE SORTATION CONVEYOR

(71) Applicant: INTELLIGRATED HEADQUARTERS, LLC, Mason, OH (US)

(72) Inventors: William M. Saurber, III, Hamilton, OH (US); Eric Roth, West Chester, OH (US); Jacob D. Wieneke, Liberty Township, OH (US); Justin J. Zimmer, Dayton, OH (US); John Williams Rugh, Terrace Park, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/784,489

(22) Filed: Feb. 7, 2020

(51) Int. Cl.
  *B65G 43/06* (2006.01)
  *B65G 43/02* (2006.01)
  *B65G 47/84* (2006.01)

(52) U.S. Cl.
  CPC .......... *B65G 43/06* (2013.01); *B65G 43/02* (2013.01); *B65G 47/844* (2013.01); *B65G 2203/0275* (2013.01); *B65G 2203/042* (2013.01)

(58) Field of Classification Search
  CPC .. B65G 43/06; B65G 43/02; B65G 2203/042; B65G 47/844; B65G 2203/0275
  See application file for complete search history.

(56) References Cited

U.S. PATENT DOCUMENTS

| | | | | |
|---|---|---|---|---|
| 4,884,677 A | * | 12/1989 | Yu | B65G 47/844 198/370.02 |
| 5,131,522 A | * | 7/1992 | Fujio | B65G 47/844 198/370.02 |
| 5,165,515 A | * | 11/1992 | Nitschke | B65G 47/844 198/349.95 |
| 5,167,315 A | * | 12/1992 | Doane | B65G 47/844 198/440 |
| 5,275,273 A | | 1/1994 | Veit et al. | |
| 8,776,982 B2 | | 7/2014 | Onayama | |
| 2007/0295579 A1 | * | 12/2007 | Hysell | B65G 47/844 198/370.02 |
| 2011/0042181 A1 | * | 2/2011 | Steenwyk | B65G 47/844 198/358 |
| 2020/0384507 A1 | * | 12/2020 | Nowicki | B65G 47/844 |

OTHER PUBLICATIONS

Flowsort Modular Sorting Systems, Smart Shoe & Smart Pin, [online] [retrieved on May 5, 2020] retrieved from the Internet URL: www.flow-sort.com, 1 page.

* cited by examiner

Primary Examiner — Mark A Deuble
(74) Attorney, Agent, or Firm — Alston & Bird LLP

(57) ABSTRACT

A shoe sorter is described. The shoe sorter can include a switch plate that supports movement of a shoe pin of a pusher shoe, a finger, and an actuation arm. In some examples, the finger can be configured to be moved in a first direction in response to a portion of the shoe pin contacting a portion of the finger. The actuation arm can be pivotably engaged to the finger so that a movement of the finger in the first direction can cause a movement of the actuation arm in a second direction. In this regard, the actuation arm in the second direction can cause a change in a signal outputted by the photoelectric sensor coupled to the shoe sorter. This change in the signal can be used by a processor to determine that the shoe pin is misaligned.

20 Claims, 10 Drawing Sheets

SYSTEM, APPARATUS, AND METHOD FOR DETECTING A FAULT IN A PUSHER SHOE OF A SHOE SORTATION CONVEYOR

TECHNOLOGICAL FIELD

Example embodiments described herein relate generally to a shoe sortation conveyor comprising a pusher shoe with a shoe pin, and, more particularly, to techniques for detecting a fault in the pusher shoe of the shoe sortation conveyor.

BACKGROUND

Generally, in material handling environments like, but not limited to, distribution centers, warehouses, inventories, or shipping centers, a material handling system, can convey, handle, sort, and organize various type of articles (e.g. items, cartons, cases, containers, shipment boxes, totes, packages, and/or the like) at high speeds on a conveyor.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein relate to a shoe sorter. The shoe sorter can comprise a switch plate that can be configured to define a movement path of a shoe pin of the shoe sorter. Further, the shoe sorter can comprise a finger mechanically coupled to the switch plate. In accordance with said example embodiments, the finger can be configured to be moved in a first direction in response to a first portion of the shoe pin contacting a top portion of the finger. Furthermore, the shoe sorter can comprise an actuation arm. The actuation arm can be pivotably engaged to the finger so that a movement of the finger in the first direction causes a movement of the actuation arm in a second direction. In this regard, in some examples, the actuation arm in the second direction causes a change in a signal outputted by the photoelectric sensor. Further, in response to the change in the signal outputted by the photoelectric sensor, a misalignment of the shoe pin can be determined by a processor coupled to the shoe sorter.

In accordance with some example embodiments described herein, in response to a distal end of the actuation arm being in a first position due to the movement of the actuation arm in the second direction, the photoelectric sensor starts receiving light previously obstructed by the actuation arm.

According to some example embodiments, the finger can be positioned along the movement path defined by the switch plate so that in response to movement of the shoe pin in the movement path, a bent portion of the shoe pin makes a contact with the top portion of the finger. Further, in some example embodiments, the finger can be positioned along the movement path defined by the switch plate so that upon movement of a second shoe pin in the movement path, a non-bent pin portion of the second shoe pin passes through the movement path along the finger without making a contact with the top portion of the finger.

According to some example embodiments described herein, the processor coupled to the shoe sorter can generate an alert indicating that the shoe pin is misaligned.

In some example embodiments, the processor coupled to the shoe sorter can be the processor can be configured to generate a command to cease operation of the shoe sorter based on determining that the shoe pin is misaligned.

According to some example embodiments, the top portion of the finger can be tapered so that in response to the first portion of the shoe pin contacting the top portion of the finger, the finger and the actuation arm pivots about a pivot pin.

According to some example embodiments, the switch plate can be configured to define, a first movement path for movement of a first set of shoe pins for diverting of a first set of items on the shoe sorter. Further, the switch plate of the shoe sorter can also define, a second movement path for movement of a second set of shoe pins for non-diverting of a second set of items on the shoe sorter. To this end, according to said example embodiments, the shoe sorter can further comprise, a first finger and a first actuation arm. Further, the shoe sorter can comprise, a second finger and a second actuation arm. In this regard, the first finger can be configured to be mechanically engaged on the switch plate along the first movement path. Further the first finger can pivotably engage to the first actuation arm, so that, a movement of the finger in the first direction causes a movement of the actuation arm in the second direction. Furthermore, the second finger can be configured to be mechanically engaged on the switch plate along the second movement path. Furthermore, the second finger can pivotably engage to the second actuation arm so that a movement of the second finger in a third direction causes a movement of the second actuation arm in a fourth direction.

In some example embodiments, the processor can be configured to detect misaligned shoe pins from amongst the first set of shoe pins and the second set of shoe pins by identifying changes in signals outputted by the photoelectric sensor due to the movement of at least one of the first actuation arm and the second actuation arm, respectively.

Some example embodiments described herein relate to a fault detecting unit configured for detecting a fault in a shoe pin of a shoe sorter. The fault detecting unit can comprise a photoelectric sensor, a finger, and an actuation arm. The finger can be mechanically coupled to a portion of a switch plate of the shoe sorter. Further, the finger can be configured to be moved in a first direction, in response to, a portion of the shoe pin contacting a top portion of the finger. Furthermore, the actuation arm can be pivotably engaged to the finger. In this regard, a movement of the finger in the first direction can cause a movement of the actuation arm in a second direction. Furthermore, in some example embodiments, the actuation arm in the second direction can cause a change in an amount of light received by the photoelectric sensor of the fault detecting unit.

According to some example embodiments, the change in the light received by the photoelectric sensor of the fault detecting unit can cause a change in signal outputted by the photoelectric sensor. In this regard, the change in the signal can be indicative of a misalignment of the shoe pin. According to some example embodiments, in response to a distal end of the actuation arm being in a first position due to the movement of the actuation arm in the second direction, a path of light received at the photoelectric sensor can be un-obstructed by the actuation arm, thereby, causing the change in the signal outputted by the photoelectric sensor.

According to some example embodiments, the finger can be positioned along a movement path defined by the switch plate so that upon movement of a first shoe pin in the movement path, a bent portion of the first shoe pin can make a contact with the top portion of the finger.

In some example embodiments, the finger of the fault detecting unit can be positioned along a movement path defined by the switch plate. The finger can be positioned so that upon movement of a second shoe pin in the movement path, a non-bent portion of the second shoe pin passes through the movement path along the finger without making a contact with the top portion of the finger.

According to some example embodiments, the top portion of the finger can be tapered so that in response to the portion of the shoe pin contacting the top portion of the finger, the finger and the actuation arm pivots about a pivot pin.

In some example embodiments, the fault detecting unit can also comprise a spring pin. The spring pin can be mechanically engaged to the actuation arm. The spring pin can be configured to retract back the actuation arm in a direction opposite to the second direction upon movement of the actuation arm in the second direction.

Some example embodiments described herein relate to a method for detecting a fault in a shoe pin of a shoe sorter. The method can comprise, initializing a photoelectric sensor of the shoe sorter. Further, the method can comprise, initiating a movement of the shoe pin along a movement path defined by a switch plate of the shoe sorter. The method can further comprise, identifying by a processor, a change in a signal value outputted by the photoelectric sensor. In this regard, the change in the signal value can be due to an un-obstruction to light received at the photoelectric sensor. The un-obstruction can be caused due to a movement of an actuation assembly of the shoe sorter in response to the shoe pin contacting with a portion of the actuation assembly.

In some example embodiments, the actuation assembly can comprise, a finger mechanically coupled to a portion of a switch plate of the shoe sorter. The finger can be configured to be moved in a first direction in response to the shoe pin contacting a portion of the finger. Furthermore, the actuation assembly can comprise, an actuation arm pivotably engaged to the finger so that a movement of the finger in the first direction causes movement of the actuation arm in a second direction. In this regard, the movement of the actuation arm in the second direction can cause the un-obstruction to the light received at the photoelectric sensor.

According to some example embodiments, the method can further comprise generating an alert in response to identification of the change in the signal value. In this regard, the alert can be indicative of misalignment of the shoe pin.

In some example embodiments, the method can further comprise, generating a command to cease operations of the shoe sorter based on determining misalignment of the shoe pin.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
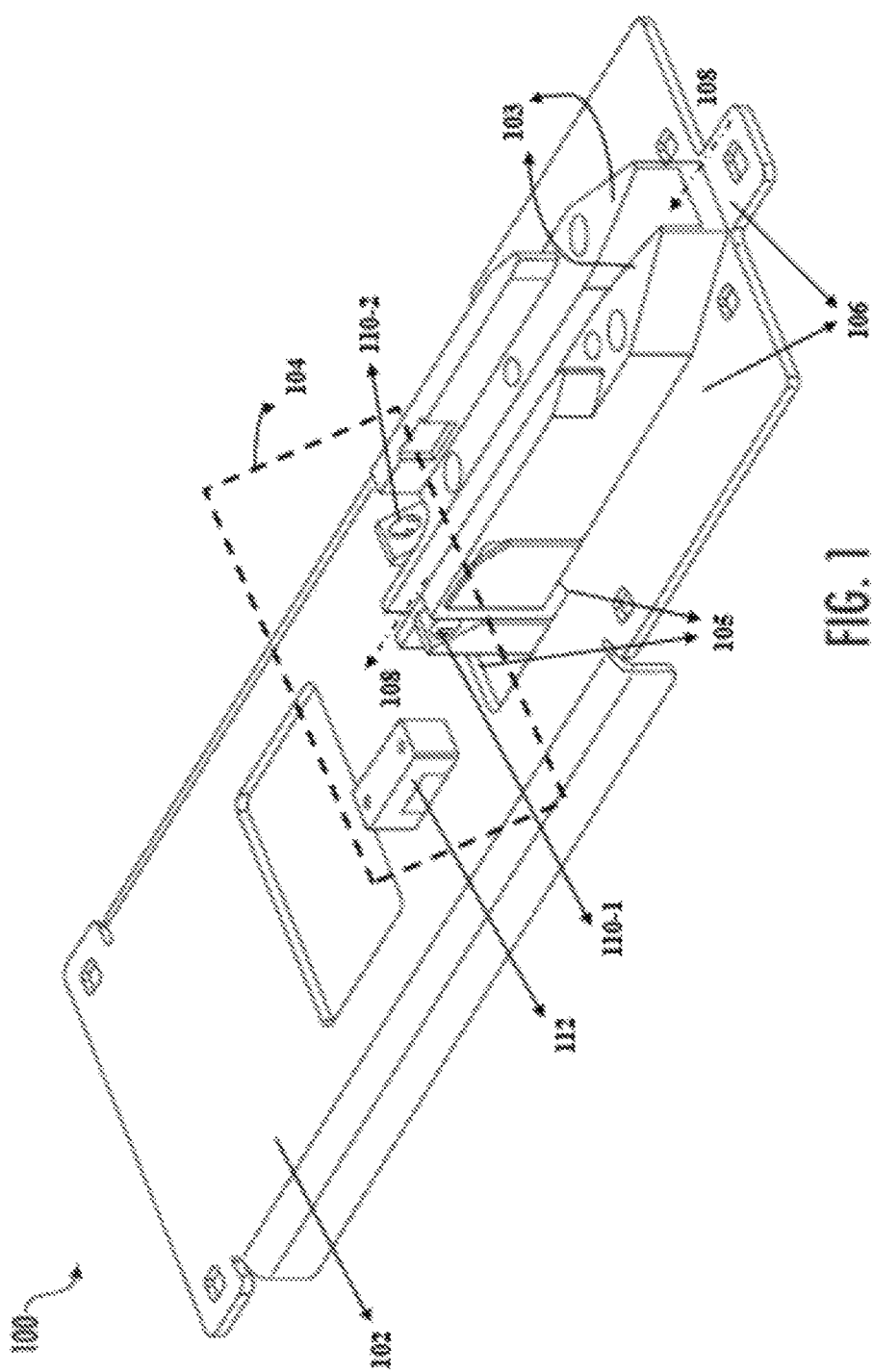
FIG. 1 illustrates a top perspective view of a switch plate of a sortation conveyor comprising a fault detecting unit, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

Various example embodiments described herein relates to a sortation conveyor (e.g. a shoe sorter) comprising one or more pusher shoes that can travel laterally (i.e. transverse to a longitudinal direction of travel of a conveyor surface of the sortation conveyor) to divert articles carried by the conveyor surface of the sortation conveyor to divert locations (or divert lanes) associated with the sortation conveyor. In this regard, in some examples, the pusher shoes can be guided along divert guide paths, so as to, gently engage and gradually accelerate conveyed articles laterally onto divert units that may be mechanically coupled to the sortation conveyor.

In some examples, the sortation conveyor and a switch assembly including a switch plate referred hereinafter at multiple instances throughout the description can correspond the sortation conveyor as described in U.S. patent application Ser. No. 16/672,979, entitled, "Conveyor with Guide Rails to support a Divert Unit", filed 4 Nov. 2019, details of which are incorporated herein by reference.

Typically, a sortation conveyor includes a switch assembly installed on a portion of conveyor frame and a divert guide path. In this regard, the switch assembly can be mounted upstream of the divert guide path along a length of the sortation conveyor. The switch assembly includes one or more plates that defines at least one movement path for movement of a shoe pin. In some examples, the plates can define a divert movement path and a home path, where the divert movement path is further connected to the divert guide path. In this regard, the divert movement path is defined for movement of the shoe pin of the pusher shoe in lateral direction and along a length of the sortation conveyor to divert an item. Further, the home path is defined for movement of another shoe pin of another pusher shoe when an item is not to be diverted. Thus, in operation, the shoe pin moves into the divert movement path defined by the one or more plates and further into the divert guide path along the length of the sortation conveyor to divert articles for sorting. The divert guide path referred herein represents an arcuate section that connects a first side frame of the sortation conveyor to the second side frame across a length of the sortation conveyor. Accordingly, as the shoe pin moves into these paths, a shoe face (also referred as head) of the pusher shoe gently makes a contact on an article conveyed on the sortation conveyor thereby guiding the article on the divert guide path and further towards the divert lane.

Usually, for smooth and unobstructed movement of the shoe pin along these paths, it is desired that the one or more plates of the switch assembly are properly aligned with each other and further with the divert guide path. To this end, in some instances, misalignment of the plates often causes obstructed movement of the shoe pin into the movement path. Consistent movement of the shoe pin into movement path of improperly installed plates even results in misalignment (or bending) of the shoe pin.

Further, in some examples, shoe pins are "misaligned" or "bent" due to presence of foreign debris in a movement path for the shoe pin, or from an issue with a product conveyed on the sortation conveyor, thereby, obstructing the pusher from traveling on its standard divert path. Further, in some instances, also due to wear and tear, the shoe pin gets misaligned or bended from its original position, which further can even result in damaging any components of the switch assembly, and/or other components of the sortation conveyor. Said differently, bent shoe pins or anomalies in pusher shoe can often cause a mis-divert of items and extensive damage throughout the sortation conveyor, if it is used in operation for a long time. Accordingly, it is desired to identify misalignment of the shoe pin from its original position and take actions for repair and/or maintenance. In other words, it is desired to identify misalignment of shoe pin of pusher shoe in a timely fashion so as to improve productive time of operating the shoe sorter by taking preventive action instead of taking a corrective action post misalignment of the shoe pin. Existing techniques for detecting misalignment of shoe pin of the shoe sorter is costly and/or has associated challenges.

Various example embodiments described herein relates to, techniques for detecting out of conformance condition or misalignment of shoe pin of a shoe sorter. By implementation of various example embodiments described hereinafter, potential damage to assembly of the sortation conveyor can be stopped that can be caused by bent shoe pins, therefore increasing customer up-time.

Turning now to the drawings, the detailed description set forth below in connection with the appended drawings is intended as a description of various configurations and is not intended to represent the only configurations in which the concepts described herein may be practiced. The detailed description comprises specific details for the purpose of providing a thorough understanding of various concepts with like numerals denote like components throughout the several views. However, it will be apparent to those skilled in the art that these concepts may be practiced without these specific details.

FIG. 1 illustrates a top perspective view 100 of a switch assembly 102 of a sortation conveyor, in accordance with some example embodiments described herein. The sortation conveyor, in some example embodiments, can correspond to a shoe sorter comprising a plurality of pusher shoes that can be travelled lateral across a conveying surface of the sortation conveyor to divert articles. In this regard, in some example embodiments, each of such pusher shoe can comprise a shoe head (i.e. a head portion) and a shoe bearing along with a shoe pin disposed below the shoe head.

Referring to FIG. 1, according to various example embodiments described herein, the switch assembly 102 can comprise, a fault detecting unit 104. In some example embodiments, the fault detecting unit 104 can be configured to detect a misalignment of at least the shoe pin and/or the shoe bearing of the pusher shoe, of the sortation conveyor.

In accordance with various example embodiments described herein, a 'shoe pin' referred herein throughout the description can correspond to any portion of the pusher shoe which can be defined below a head portion of the pusher shoe and comprises components that can travel through movement paths beneath a conveyor bed of the sortation conveyor. In this regard, a pusher shoe described in various example embodiments can comprise a head portion and a tail portion beneath the head portion. The head portion of the pusher shoe can typically correspond to some portion of the pusher shoe that makes an impact against an article on a conveyor bed of the sortation conveyor. Further, the tail portion of the pusher shoe can correspond to a portion that can travels through movement paths defined beneath the conveyor bed of the sortation conveyor. For instance, in some example embodiments, the tail portion of the pusher shoe can comprise a shoe bearing and a shoe pin. According to some example embodiments, the shoe pin can correspond to a portion of the pusher shoe which can be beneath the shoe head, i.e. including a shoe bearing and a pin of the shoe below the shoe bearing. Alternatively, in some example embodiments, the shoe pin can correspond to the pin portion below the shoe bearing of the pusher shoe.

Illustratively, the switch assembly 102 can comprise a switch plate 106. The switch plate 106 along with other components of the switch assembly 102 can be mounted on a portion of a conveyor frame, for example, but not limited to, a spreader, of the sortation conveyor. In some example embodiments, the switch plate 106 can comprise one or more members 103, for example, but not limited to, structures defined by machined plastic or metal casted molds or molded elements, that protrudes outwards from a top surface the switch plate, thereby, defining at least one movement path, i.e. paths that enables movement of the shoe bearing and the shoe pin of the pusher shoe. For instance, as illustrated, the switch plate 106 can be configured to define a movement path 108 that enables a movement of the shoe pin of the pusher shoe. Said differently, the movement path 108 defines a passage through which the shoe bearing and the shoe pin moves, thereby moving the pusher shoe across a length of the sortation conveyor.

In some example embodiments, the movement path 108 can further connect to a divert path (e.g. an arcuate path) for enabling lateral movement of the pusher shoe from one side (e.g. left side) of the sortation conveyor to another side (e.g. right side) of the sortation conveyor. In some example embodiments, the switch plate 106 can define more than one movement path 108. For instance, in some examples, the switch plate 106 can define two movement paths e.g. a divert path and a home path. In some example embodiments, the switch plate 106 can also comprise a switch (not shown) that can be installed on a portion the switch plate 106. To this end, the switch can be actuated by a processing unit (e.g. a controller of the sortation conveyor) and can be moved between two positions (e.g. a first position or a second position), thereby, enabling movement of the shoe pin in one of the two movement paths (i.e. the divert path and the home path). Said differently, in some examples, the switch can be actuated to be moved to a first position which closes a home path defined by the switch plate 106 and allows movement of the shoe pin into the divert path, thereby, causing lateral movement of the pusher shoe on the sortation conveyor to facilitate diverting of items. Accordingly, the switch can be used for selectively diverting the pusher shoe from a home path to a divert guide path based on movement of shoe pin(s) of one or more pusher shoes of the sortation conveyor along these paths, for diverting or non-diverting of the items.

In accordance with various example embodiments described herein, the fault detecting unit 104 can be configured to detect a misalignment (e.g. malfunctioning, bending, twisting and/or the like) of the shoe pin of the pusher shoe, details of which are described later in reference to FIGS. 1-6.

According to some example embodiments, the fault detecting unit 104 can comprise at least one finger, for example, a first finger 110-1 and a second finger 110-2 (interchangeably referred hereinafter, as the at least one finger 110 for purposes of brevity), a photoelectric sensor 112, and a respective actuation arm (not shown) mechanically coupled to the fingers (110-1 and 110-2). As illustrated, the at least one finger 110 can be positioned or installed on a portion of the switch assembly 102 along the switch plate 106. For instance, in some examples, the at least one finger 110 of the fault detecting unit 104 can be positioned at a distal end of the switch plate 106, i.e. adjoining to the members 103 defined by the switch plate 106, along the movement path 108 defined by the switch plate 106. In this regard, in some example embodiments, the fingers 110-1 and 110-2 may be, (a) positioned adjacent to the members 103 defining the movement path 108 towards distal end of the switch plate 106 and (b) pass through an aperture 105 defined on the switch assembly 102.

Said that, in accordance with various example embodiments described herein, the at least one finger 110 (i.e. the fingers 110-1 and 110-2) can be positioned on the switch plate 106 in a direction of movement of the shoe pin along the movement path 108 defined by the switch plate 106. Such a positioning of the fingers 110-1 and 110-2 defines a passage (a gate like structure) such that, in response to movement of a first shoe pin (not shown) in the movement path 108 and further through the passage, a bent portion of the first shoe pin makes a contact with a top portion of the at least one finger 110. Further, by such positioning, a second shoe pin with no bent portion passes through the movement path 108 and further to a divert path (not shown) without making a contact with any portion of the at least one finger 110.

In accordance with various example embodiments described herein, based on the contacting of the shoe pin to the at least one finger 110, the at least one finger 110 experiences a motion. In this regard, in accordance with various example embodiments, the at least one finger 110 can be mechanically coupled to the actuation arm (not shown), in such a manner, that the motion experienced by the at least one finger 110 can further cause a movement of the actuation arm of the fault detecting unit 104. Further, the actuation arm in a direction towards the photoelectric sensor 112 and to a defined position, causes an un-obstruction of light, previously obstructed by the actuation arm and not received by the photoelectric sensor 112, thereby causes a change in a signal output by the photoelectric sensor 112. This change in the signal is used by a controller of the sortation conveyor to determine a misalignment of the first shoe pin of the pusher shoe. In alternate embodiments, the photoelectric sensor 112 can be so installed on the switch assembly 102 so that movement of a bent or misaligned shoe pin blocks, an unobstructed or unblocked path of light received at the photoelectric sensor 112 whereas movement of a non-bent shoe pin maintains the unobstructed path or unblocked light path towards the photoelectric sensor 112. Further details of the fault detecting unit 104, are described hereinafter in reference to FIGS. 2-6.

Figure 2:
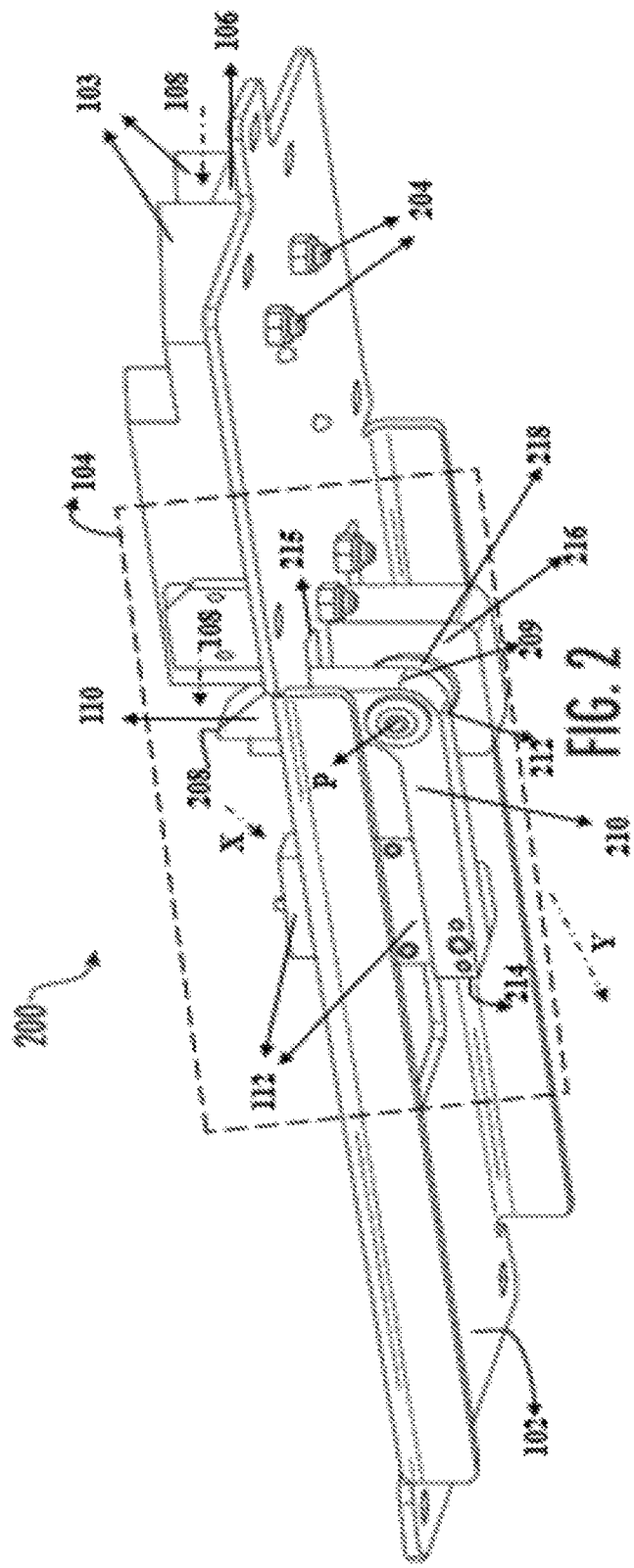
FIG. 2 illustrates a bottom perspective view of the switch plate of the sortation conveyor comprising the fault detecting unit, in accordance with some example embodiments described herein.

FIG. 2 illustrates a bottom perspective view 200 of the switch assembly 102 of the sortation conveyor comprising the fault detecting unit 104, in accordance with some example embodiments described herein. Illustratively, the switch plate 106 of the switch assembly 102 comprises members 103 (e.g. members in form of structural molds) defined on a top surface of the switch plate 106. The members 103 defines the movement path 108 for movement of one or more shoe pins of respective pusher shoes of the sortation conveyor. The bottom perspective view 200 as shown in FIG. 2 also illustrates, the switch plate 106 mounted on a portion of the switch assembly 102, via engagement means 204 (for instance, a nut and bolt assembly).

As described earlier in reference to FIG. 1, the fault detecting unit 104 can comprise the at least one finger 110, the photoelectric sensor 112, and an actuation arm 210. According to some example embodiments, the fault detecting unit 104 can be a stand-alone unit (i.e. separate from the switch assembly 102) that can be installed on a portion of the switch assembly 102 (i.e. switch assembly of an existing sortation conveyor) and can be further configured to identify misaligned shoe pin(s) that can pass over the switch assembly 102. Alternatively, in some example embodiments, the fault detecting unit 104 and its components, can be part of the switch assembly 102 itself, i.e. as manufactured and provided by original equipment manufacturers (OEMs).

In accordance with various example embodiments described herein, the at least one finger 110 of the fault detecting unit 104 can be of any shape, for example, but not limited to, in form of a bar, a cross bar, or a piece of metal, and/or the like. The at least one finger 110 can be defined between two ends, for instance, a first end 208 and a second end 209 and can be engaged on a portion of the switch assembly 102. For example, the at least one finger 110 can pass through an aperture 215 defined in the switch assembly 102. According to various example embodiments, the at least one finger 110 can be made up of a portion of a metallic sheet, or an aluminum spur, or any variety of engineered plastic. In this regard, in some example embodiments, the movement of the actuation arm 210 can be based on a physical contact of the misaligned bearing/pin with the at least one finger 110.

Further, in accordance with some example embodiments, the actuation arm 210 can of any shape and structure (e.g., but not limited to, similar to that of the at least one finger 110) and can be defined between a third end 212 and a fourth end 214. In accordance with various example embodiments described herein, the actuation arm 210 and the at least one finger 110 are pivotably engaged, for instance, either with each other or via a pivot assembly 216, about at a pivot point P. In some examples, the pivot assembly 216 can comprise at least a pivot pin 218 that can pass through an aperture defined on the pivot assembly 216 and further through a respective portion of the at least one finger 110 and the actuation arm 210, thereby pivotably engaging the at least one finger 110 with the actuation arm 210.

In alternative example embodiments, the at least one finger 110 and the actuation arm 210 can correspond to two portions (e.g. a vertical portion and a horizontal portion) of a same unit, for instance, an L-shaped member. In this regard, the vertical portion of the L-shaped member can correspond to the finger 110 and the horizontal base of the L shaped member can correspond to the actuation arm 210. In this regard, the L-shaped member can be pivotably engaged to the pivot assembly 216 so that the respective portions can be pivotably moved about the pivot point P. Said differently, the L-shaped member may be pivotably engaged to the pivot assembly 216, so that a movement of the vertical portion of the L-shaped member in a first direction X is followed by a movement of the horizontal portion of the L-shaped member in a second direction Z (for instance, but not limited to, a direction substantially perpendicular to the first direction).

According to various example embodiments described herein, the actuation arm 210 can be pivotably engaged to the at least one finger 110 in such a manner that a movement of the at least one finger 110 causes a movement of the actuation arm 210 and vice versa. In this regard, both the actuation arm 210 and the at least one finger 110 can be engaged to the pivot pin 218 so that a pivotal movement of any one of the at least one finger 110 or the actuation arm 210 causes a resulting movement to the another. Said differently, in some example embodiments, the actuation arm 210 can be pivotably engaged to the at least one finger 110 in a manner that a movement of the at least one finger 110 in a first direction can cause a movement of the actuation arm 210 in a second direction.

Figure 5:
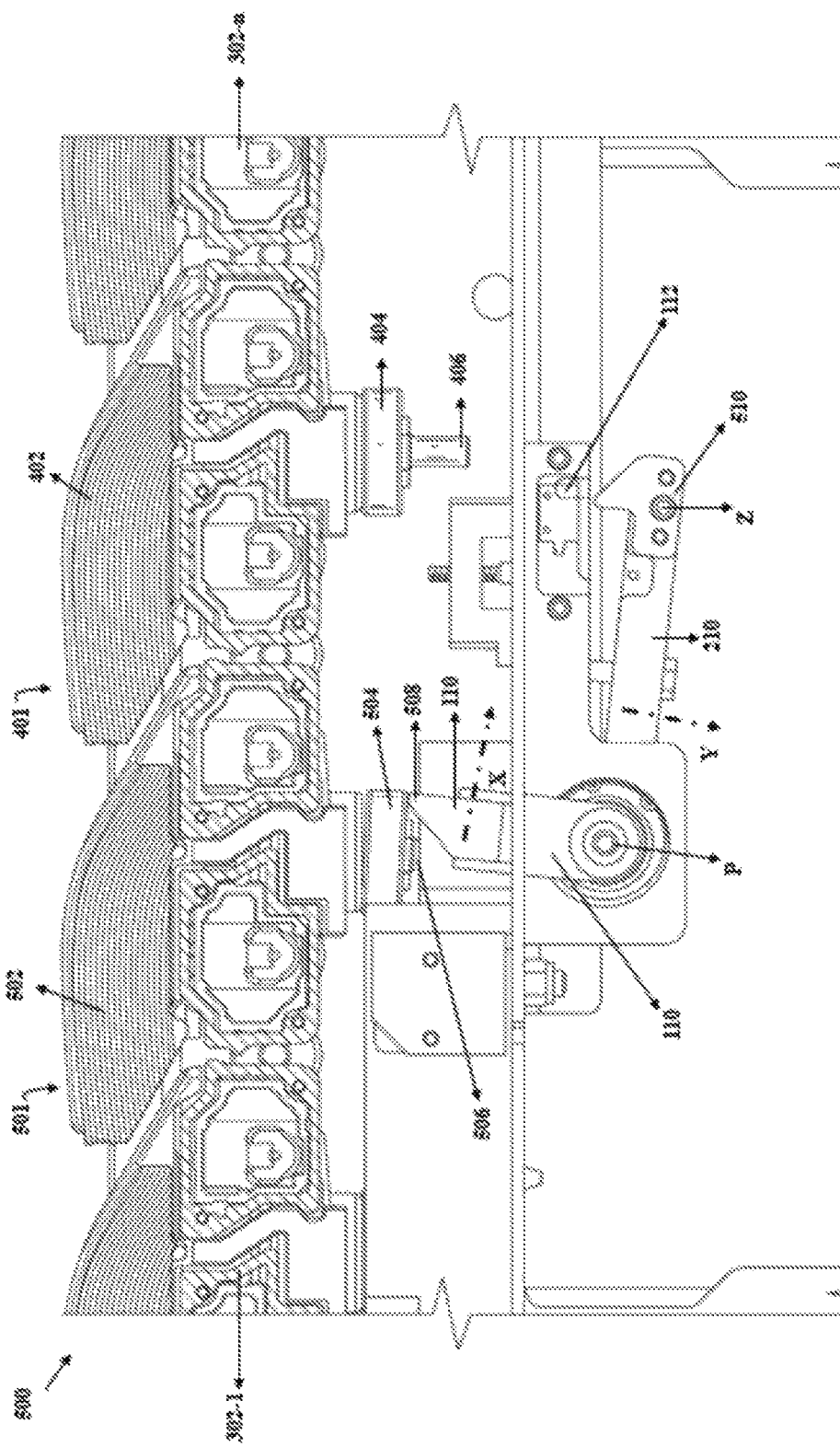
FIG. 5 illustrates another perspective view depicting a second state of the fault detecting unit, in which a misaligned shoe pin and a misaligned shoe bearing of another pusher shoe moves through the movement path, thereby, making a contact with a portion of the at least one finger of the fault detecting unit, in accordance with some example embodiments described herein.

Also, with regard to the alternative example embodiment, where the at least one finger 110 and the actuation arm 210 are parts of the L-shaped member, a movement in a vertical portion of the L-shaped member (that may be caused due to contacting of the shoe pin) in the first direction X can further cause a movement of the horizontal portion of the L-shaped member in a second direction Z. FIG. 5 illustratively depicts exemplary movement of the at least one finger 110 and the actuation arm 210. In some example embodiments, a spring pin (not shown) may be mechanically coupled to the actuation arm 210 and a portion of the switch assembly 102. The spring pin can be configured to retract back the actuation arm 210 in a direction opposite to the second direction upon movement of the actuation arm in the second direction.

In accordance with various example embodiments described herein, the actuation arm 210 in the second direction Z can cause an un-obstruction of a light path towards the photoelectric sensor 112 which is previously obstructed by the actuation arm 210, details of which are described hereinafter in reference to FIGS. 3-6. In alternate embodiments, the actuation arm 210 in the second direction Z can cause an obstruction of a light path towards the photoelectric sensor 112, thereby generating a change in signal outputted by the photoelectric sensor 112. Further, this obstruction or un-obstruction of the light path can cause a change in signal value outputted by the photoelectric sensor 112. Furthermore, in accordance with various example embodiments described herein, the change in the signal value can be used to determine a misaligned condition of the shoe pin of the pusher shoe, details of which are described hereinafter.

Figure 3:
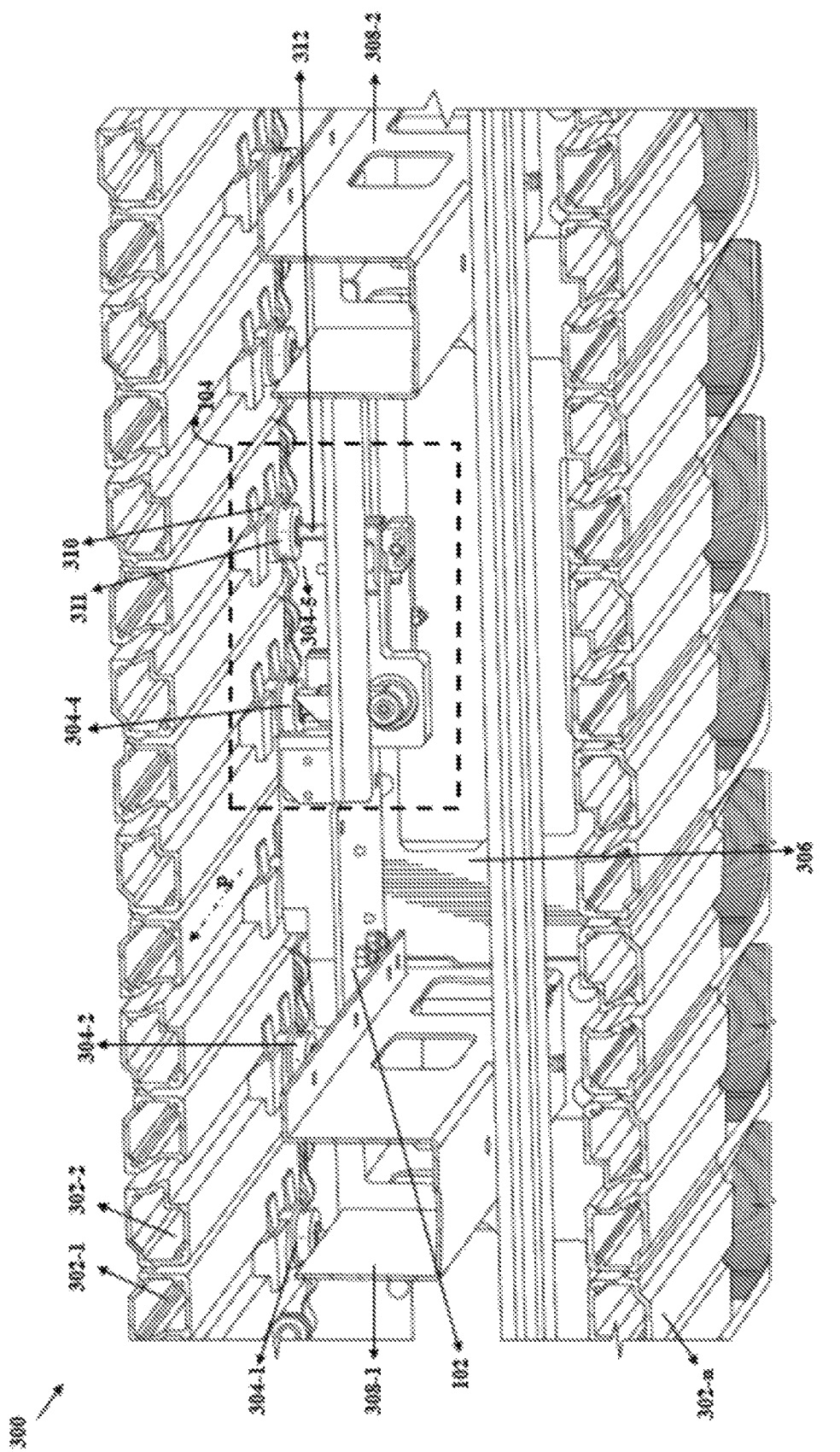
FIG. 3 illustrates a perspective view of a section of the sortation conveyor that comprises the fault detecting unit to detect misalignment of at least one of a shoe bearing and/or a shoe pin of a pusher shoe of the sortation conveyor, in accordance with some example embodiments described herein.

FIG. 3 illustrates a perspective view 300 of a section of the sortation conveyor that comprises the fault detecting unit 104 to detect misalignment of at least one of a shoe bearing and/or a shoe pin of a pusher shoe of the sortation conveyor, in accordance with some example embodiments described herein. In some example embodiments, the sortation conveyor can correspond to a slat shoe sorter having multiple slats 302-1 . . . 302-*n* that forms an endless conveying bed that loops around a section of conveyor frame and can support conveying of one or more items by the sortation conveyor. In some example embodiments, the slats 302-1 . . . 302-*n* can be in form of members, for example, but not limited to, aluminum members, that can support transportation of articles on the sortation conveyor. In some example embodiments, the sortation conveyor can also comprise a pair of endless chains that can be positioned adjacent to two side conveyor frames respectively of the sortation conveyor, where the multiple slats 302-1 . . . 302-*n* can be connected at their opposite ends to the respective chains in order to provide a moving conveyor surface.

FIG. 3 also illustrates, a portion of a conveyor frame 306 of the sortation conveyor. Illustratively, the slats (304-1 . . . 304-*n*) can be installed between two side frames of the conveyor frame 306. Further, in some example embodiments, the conveyor frame 306 can comprise one or more spreaders 308-1, 308-2, . . . 308-*n* that can be mounted between the two side frames. The spreaders 308-1 . . . 308-*n* can be configured to support mounting of one or more components, for example, but not limited to, the switch assembly 102, the switch plate 106, one or more guide rails (not shown) etc. Illustratively, the fault detecting unit 104 can be positioned beneath the multiple slats 302-1 . . . 302-*n* and can be supported on the switch plate 106 mounted on the spreader 308-1.

In accordance with some example embodiments, as illustrated, each slat (302-1, 302-2 . . . 302-*n*) can be fitted with a respective pusher shoe (304-1, 304-2, . . . 304-*n*). In this regard, each pusher shoe (304-1 . . . 304-*n*) can comprise a shoe head, a shoe bearing, and a shoe pin. The shoe bearing and the shoe pin can be disposed below the shoe head. For instance, as illustrated, the pusher shoe 304-5 comprises a shoe head 310, a shoe bearing 311, and a shoe pin 312, where the shoe bearing 311 and the shoe pin 312 are disposed beneath the shoe head 310.

As described earlier, in some examples, the sortation conveyor can correspond to a slat shoe sorter having multiple slats where each pusher shoe travels laterally across a length of the sortation conveyor between multiple slats. Said that, in an example operation of the sortation conveyor, each pusher shoe (304-1 . . . 304-n) can be configured to glide and travel laterally (for instance, along direction P) across the respective slat (302-1 . . . 302-n) based on a movement of a shoe pin (e.g. the shoe pin 312) and the shoe bearing (e.g. shoe bearing 311) of the respective pusher shoe (304-1 . . . 304-n). To this end, shoe bearings and respective shoe pins (e.g. the shoe bearing 311 and the shoe pin 312) can travel in the movement paths (e.g. movement path 108) defined by the switch plate 106 and a divert guide path of divert track (not shown). Accordingly, by way of implementation of various example embodiments described herein, a movement of the one or more pusher shoes (304-1 . . . 304-n) of the sortation conveyor can be guided by a guide track formed by movement paths defined by the switch plate 106 and the divert guide track connected to the switch plate 106, beneath the conveying surface of the sortation conveyor.

Figure 4:
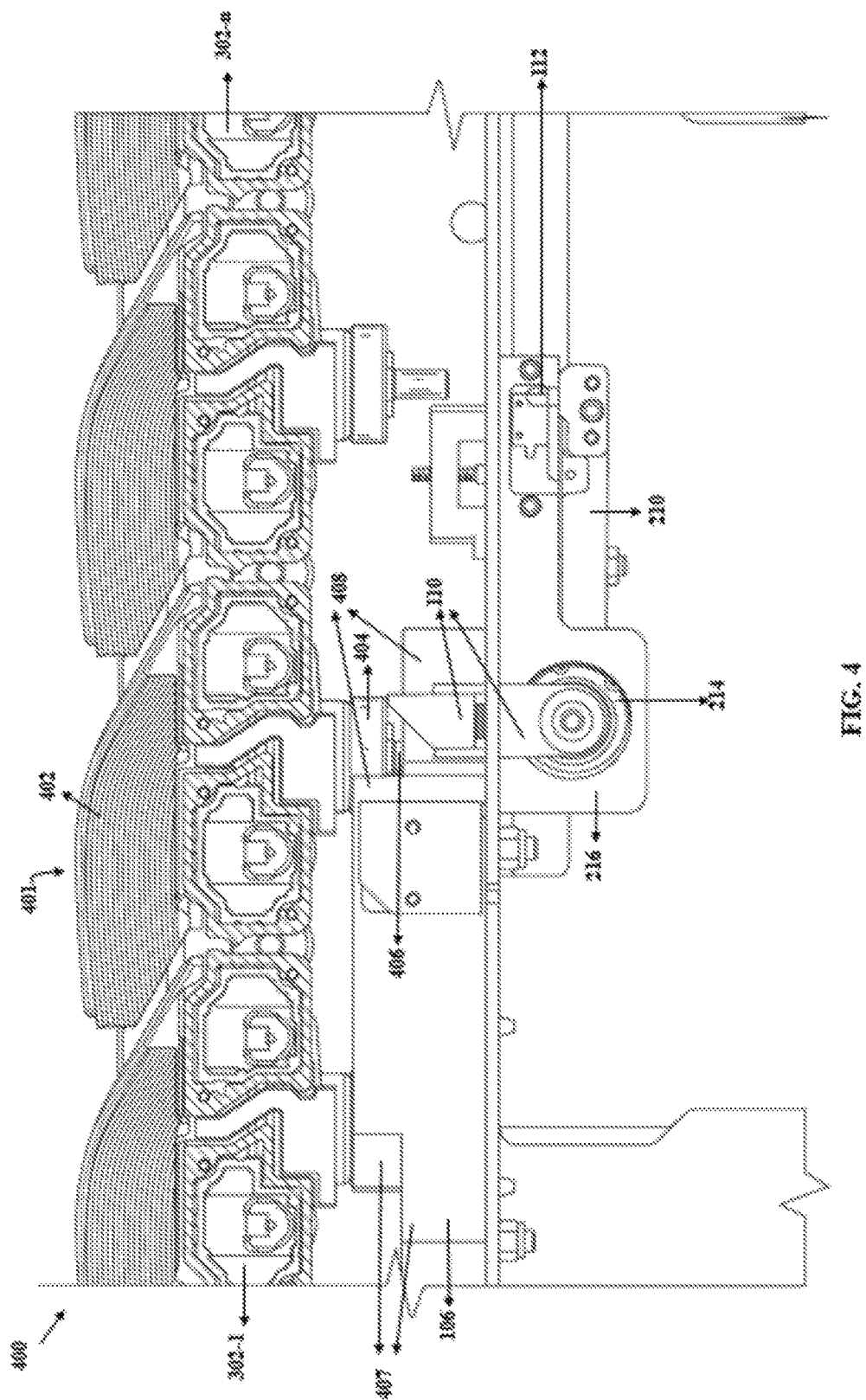
FIG. 4 illustrates a perspective view depicting a first state of the fault detecting unit, in which a shoe pin and a bearing of a pusher shoe moves through the movement path defined by the switch plate, without making a contact with a portion of the at least one finger of the fault detecting unit, in accordance with some example embodiments described herein.

FIG. 4 illustrates a perspective view 400 depicting a first state of the fault detecting unit 104, in which a shoe pin and a bearing of a pusher shoe moves through the movement path 108 defined by the switch plate 106, without making a contact with a portion of the at least one finger 110 of the fault detecting unit 104. In this regard, the shoe pin and the shoe bearing of the pusher shoe is not misaligned from its original shape and alignment.

Further, FIG. 5 illustrates another perspective view 500 depicting a second state of the fault detecting unit 104, in which a misaligned shoe pin and a misaligned shoe bearing of another pusher shoe moves through the movement path 108, thereby, making a contact with a portion of the at least one finger 110 of the fault detecting unit 104.

According to some example embodiments, as illustrated in FIG. 4, a first pusher shoe 401 can comprise a first shoe head 402, a first shoe bearing 404, and a first shoe pin 406. In this regard, according to said example embodiments, none of the first shoe bearing 404 and/or the first shoe pin 406 is misaligned from its original shape. Said differently, the first shoe bearing 404 and the first shoe pin 406 are non-faulty and are of correct shape and possess correct alignment relative to its shoe head 402. Further, in accordance with some example embodiments, in an operation of gliding the first pusher shoe 401 laterally across the slats between two ends of the sortation conveyor, the shoe pin and the shoe bearing travels through the movement path 108 defined by the switch plate 106. Illustratively, the switch plate 106 can comprise two ends, for instance, a primal end 407 and a distal end 408. The movement path 108 can be defined between the two ends 407 and 408. In this regard, the movement path 108 referred herein, can be configured for movement of shoe bearings and shoe pins of respective pusher shoes. According to some example embodiments, the pusher shoe 401 can be initially installed/housed at a home position, i.e. at the primal end 407 on the switch plate 106. Accordingly, a movement of the first shoe pin 406 and the first shoe bearing 404 can start from the primal end 407 of the switch plate 106 and can continue further towards the distal end 408 of the switch plate 106.

As illustrated, in accordance with various example embodiments, the at least finger 110 of the fault detecting unit 104 can be mounted on a portion of the switch assembly 102 comprising the switch plate 106. In this regard, the at least one finger 110 can be positioned adjacent or in proximity to the distal end 408 of the switch plate 106 along a guide track for movement of shoe pins and the shoe bearings beneath the slats (302-1 . . . 302-n).

In some example embodiments, the fault detecting unit 104 can comprise two fingers, i.e. the first finger 110-1 and the second finger 110-2, where each finger 110-1 and 110-2 can be pivotably engaged to a respective actuation arm. In such embodiments, each of the fingers 110-1 and 110-2, can be mounted on a portion of the switch assembly 102 so that each finger can be positioned adjacent in proximity to the distal end 408 of the switch plate 106 along two opposite sides of the switch plate 106. In this regard, the two fingers 110-1 and 110-2 can be positioned at so as to form a defined gap between each other, along the movement path 108 of the switch plate 106. To this end, the fingers 110-1 and 110-2 can be so positioned thereby forming a gate like structure, for passage of bearings and shoe pins of the respective pusher shoes. In this regard, the fingers 110-1 and 110-2 are mounted on the switch assembly 102 at such a position, so that the gate like structure allows passage of a non-bent shoe pin and shoe bearing and obstructs a passage of a bent shoe pin and bent shoe bearing.

Said differently, the gate like structure defined by fingers 110-1 and 110-2 defines a passage so that the first shoe bearing 404 and the first shoe pin 406 (i.e. non-bent/non misaligned shoe pin and bearing) moves on the movement path 108 and passes through the gate formed by the fingers 110-1 and 110-2 without any portion of the first shoe bearing 404 and the first shoe pin 406 making any contact with any portion of the fingers 110-1 and 110-2. To this end, FIG. 4 is an example illustration of such a state where the shoe pin 406 and/or the shoe bearing 404 passes through the at least one finger 110 without making any contact with the finger 110.

However, on the contrary, the gate like structure defined by the fingers 110-1 and 110-2 obstructs a passage of a misaligned shoe bearing and a misaligned shoe pin. In other words, the passage of the bent shoe bearing and bent shoe pin through the gate causes contacting of at least some portion of the shoe bearing and/or the shoe pin with at least some portion (e.g. a top portion) of the fingers 110-1 and/or 110-2. To this end, FIG. 5 illustrates such an example state of the fault detecting unit 104.

FIG. 5 illustrates another perspective view 500 depicting a second state of the fault detecting unit 104. In the second state, as illustrated in FIG. 5, a second shoe bearing 504 (e.g. a misaligned/bent shoe bearing) and a second shoe pin 506 (e.g. a misaligned/bent shoe pin) of a second pusher shoe 501 comprising a second shoe head 502, as it moves through the movement path 108, contacts with a portion 508 (e.g. a top portion) of the at least one finger 110 of the fault detecting unit 104.

As illustrated, the at least one finger 110 can be mechanically coupled or mounted on a portion of the switch plate 106 along the movement path 108. In this regard, the at least one finger 110 can be configured to be moved in the first direction X in response to a portion of the second shoe bearing 504 and/or the second shoe pin 506 contacting a top portion, i.e. the portion 508 of the at least one finger 110. In some example embodiments, the top portion, i.e. the portion 508 can be tapered so that in response to a portion of the second shoe bearing 504 and/or the second shoe pin 506 contacting the portion 508 of the at least one finger 110, the at least one finger 110 and the actuation arm 210 pivots about the pivot pin 218. Further, in accordance with some example embodiments, the movement of the at least one finger 110 in the first direction X depends on the contacting and/or a force with which the second shoe bearing 504 and/or the second shoe pin 506 makes a contact with the portion 508 of the at least one finger 110. In this regard, in some example embodiments, the at least one finger 110 can be designed so as to be able to withstand an impact of at least one of the shoe bearing 504 and/or the shoe pin 506. In accordance with some example embodiments, the impact on the at least one finger 110 can be such that, it can cause movement of the actuation arm 210, thereby, causing a change in the signal outputted by the photoelectric sensor 112 (e.g. a photo eye), and return to an initial value before a next shoe arrives (so as to be able to detect if two pusher shoes one after another comprises a bent shoe pin and/or shoe bearing).

Also, in some example embodiments, the at least one finger 110 can be so designed so that if a shoe pin is so misaligned that the passage of the misaligned shoe pin (e.g. the second shoe pin 506) can potentially cause damage to internal components of the shoe sorter due to its movement, the misaligned shoe pin during the movement along the passage can contact at least some portion of the at least one finger 110 which can cause detectable movement of the actuation arm 210 in the second direction.

Illustratively, the at least one finger 110 can be pivotably connected to the actuation arm 210 via the pivot assembly 216 comprising the pivot pin 218, as described in FIG. 2. To this end, in accordance with some example embodiments described herein, as the actuation arm 210 is pivotably engaged to the at least one 110 finger, a movement of the at least one finger 110 in the first direction X causes a movement of the actuation arm 210 in the second direction Y.

Alternatively, as described earlier, in some example alternative embodiments, where the at least one finger 110 and the actuation arm 210 are parts of a same unit, i.e. the L-shaped member, a movement of the vertical portion i.e. the finger 110 in the first direction X is followed by movement of the horizontal portion, i.e. the actuation arm 210 of the L-shaped member in the second direction Y.

In accordance with various example embodiments, the actuation arm 210 in the second direction Y causes a break in a signal of the photoelectric sensor 112. In some examples, the actuation arm 210 in the second direction Y, can cause a break in the signal of the photoelectric sensor 112, in an instance, when a portion 510 of the actuation arm 210 reaches a defined position Z in its movement path. To this end, in some example embodiments, the actuation arm 210 in the second direction Y un-obstructs a light path towards the photoelectric sensor 112 which can be previously obstructed by the actuation arm 210, thereby causing change in a signal outputted by the photoelectric sensor 112. Accordingly, in such example embodiments, the actuation arm 210 in the second direction Y can cause sudden change in light received at the photoelectric sensor 112, i.e. for a moment when the portion 510 reaches the position Z and the light is received by the photoelectric sensor 112. In accordance with various example embodiments described herein, the sortation conveyor can comprise a processor that can be coupled to the photoelectric sensor 112. In some examples, the change in the signal outputted by the photoelectric sensor 112 can be accessed by the processor to identify a misalignment of the second shoe bearing 504 and/or the second shoe pin 506, details of which are further described in reference to FIG. 6.

Figure 6:
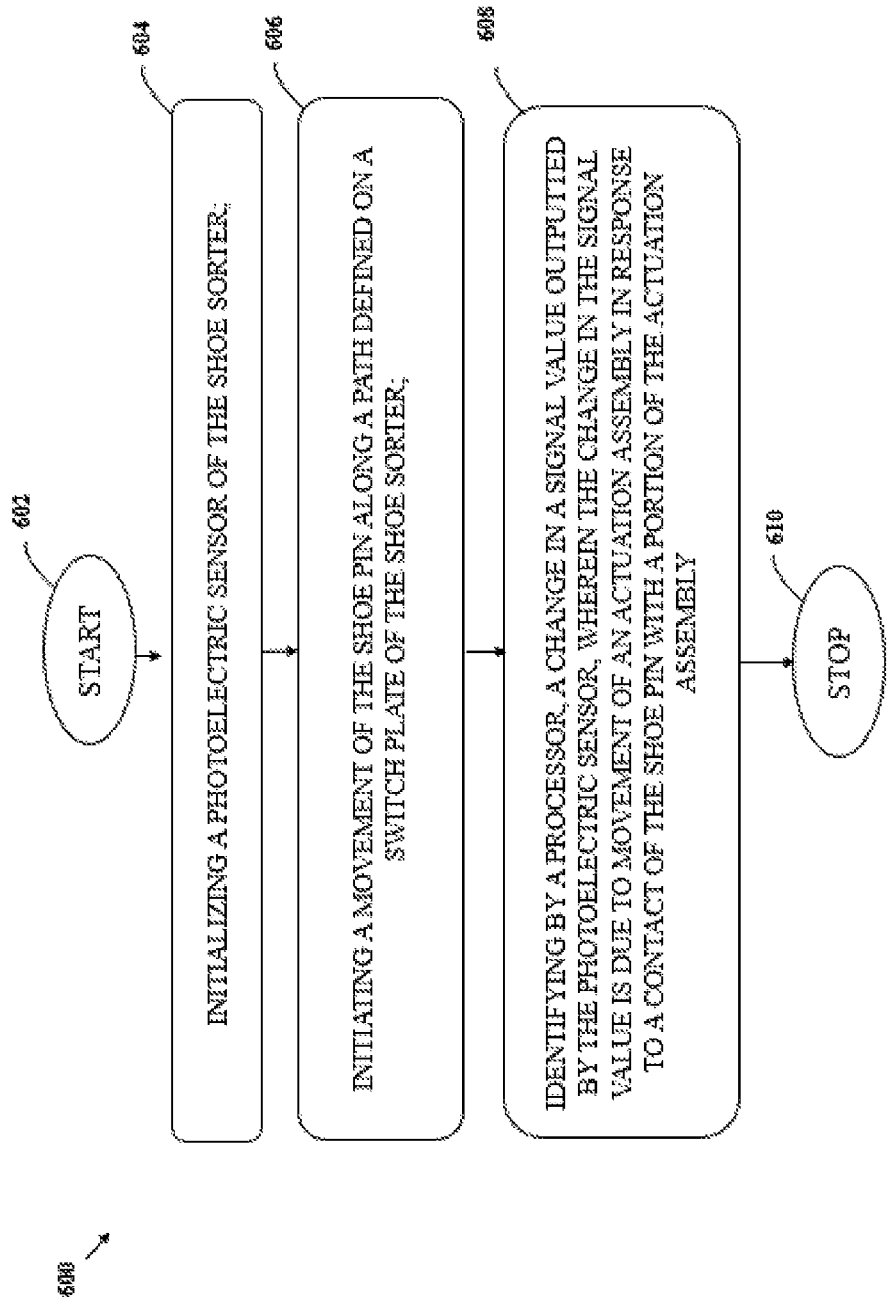
FIG. 6 illustrates an example flowchart representing operations for a method for detecting malfunctioning of a pusher shoe of the sortation conveyor, in accordance with various example embodiments described herein.

FIG. 6 illustrates an example flowchart representing operations for a method for detecting malfunctioning of a pusher shoe of the sortation conveyor, in accordance with various example embodiments described herein.

It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 6, when executed, convert the computer or processing circuitry into a particular machine configured to perform an example embodiment of the present invention. Accordingly, the operations of FIG. 6 can define an algorithm for configuring a computer or processor, to perform an example embodiment. In some cases, a general-purpose computer may be provided with an instance of the processor which performs the algorithm of FIG. 6 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

Referring to the flowchart of FIG. 6, a method 600 to detect malfunctioning of the at least one of the shoe bearing 504 and the shoe pin 506 of the pusher shoe 501 of the sortation conveyor. According to some example embodiments, the sortation conveyor may correspond to a shoe sorter comprising components that can operate based on some techniques as described in U.S. patent application Ser. No. 12/014,922, entitled, "Sortation Conveyor", filed 16 Jan. 2008 and/or U.S. patent application Ser. No. 15/147, 475, entitled, "High-speed, dual-sided shoe sorter with offset induct", filed 5 May 2016, details of which are incorporated herein by reference.

The method starts at step 602. At step 604, the sortation conveyor may comprise means such as, a processor to initialize the photoelectric sensor 112 of the sortation conveyor. In some examples, the photoelectric sensor 112 can be initialized in response to initialization of an article conveying operation of the sortation conveyor.

Moving to step 606, the sortation conveyor can comprise means such as, the processor to initiate a movement of the pusher shoe 501. In this regard, the movement of the pusher shoe can include movement of the shoe bearing 504 and the shoe pin 506 along the movement path 108 defined by the switch plate 106 of the sortation conveyor, thereby, moving the pusher shoe 501 laterally across a slat of the sortation conveyor.

According to various example embodiments, the pusher shoe 501 may move either into a home path or a divert path defined by members 103, on a top surface of the switch plate 106. To this end, in some examples, the shoe bearing 504 and the shoe pin 506 of the pusher shoe 501 may move through the divert path based on actuation of a switch of the switch plate 106 when diverting an item on a surface of the sortation conveyor is desired. The divert path may correspond to the movement path 108, as illustrated and described in FIGS. 1-5.

Moving to step 608, the sortation conveyor may comprise means such as, the processor to identify a change in a signal value outputted by the photoelectric sensor 112. In this regard, in some example embodiments, the change in the signal value can be due to an un-obstruction to light emitted towards the photoelectric sensor 112. Said differently, the change in the signal value can be due to un-obstruction of the path of light previously obstructed by the actuation arm 210. To this end, in some example embodiments, the un-obstruction to the light may be caused due to movement of the actuation assembly (i.e. some portion of the at least one finger 110 and the actuation arm 210), in response to, at least one of, the shoe bearing 504 and the shoe pin 506 of the pusher shoe 501, contacting with the top portion 510 of the at least one finger 110 which can be mechanically coupled to the actuation arm 210. The method stops at step 610.

In some example embodiments, the method 600 can also include generating an alert in response to identification of the change in the signal value. In this regard, in an example embodiment, the alert can be indicative of misalignment of the shoe pin. Further, in another example embodiments, the alert may be generated to notify a worker about a faulty condition of the pusher shoe 501. In this regard, in some examples, the faulty condition of the pusher shoe 501 may correspond to a bending or a misalignment of the shoe bearing 504 and/or the shoe pin 506. In another example embodiment, the method 600 can also comprise generating a command to cease operations of the sortation conveyor based on determining of the misalignment of the shoe bearing 504 and/or the shoe pin 506.

By way of implementation of various example embodiments described herein, a non-damaged shoe (i.e. pusher shoe without any bent or mis-alignment of shoe pin and/or shoe bearing) will pass through a specially designed gate formed by the fingers 110-1 and 110-2 without contacting any portions of the fingers 110-1 and 110-2. However, the damaged shoe (i.e. a pusher shoe with any bent or mis-alignment of shoe pin and/or shoe bearing) will contact some portion of the fingers 110-1 and/or 110-2 as it passes through the gate, thereby also moving the actuation arm 210 that will cause a break in the alert signal of the photoelectric sensor 112. This would signal an anomaly or a faulty condition that represents possibly a bent pin or a misaligned shoe pin or shoe bearing. Further, in some example embodiments, if such an anomaly is detected, position information of the misaligned shoe pin can be determined and one or more commands can be generated, for example, but not limited to, to shut down the sorter, or send a warning, or enact some other type of programmed result such as auto-diverting an abnormal shoe and flagging it for inspection.

Figure 7:
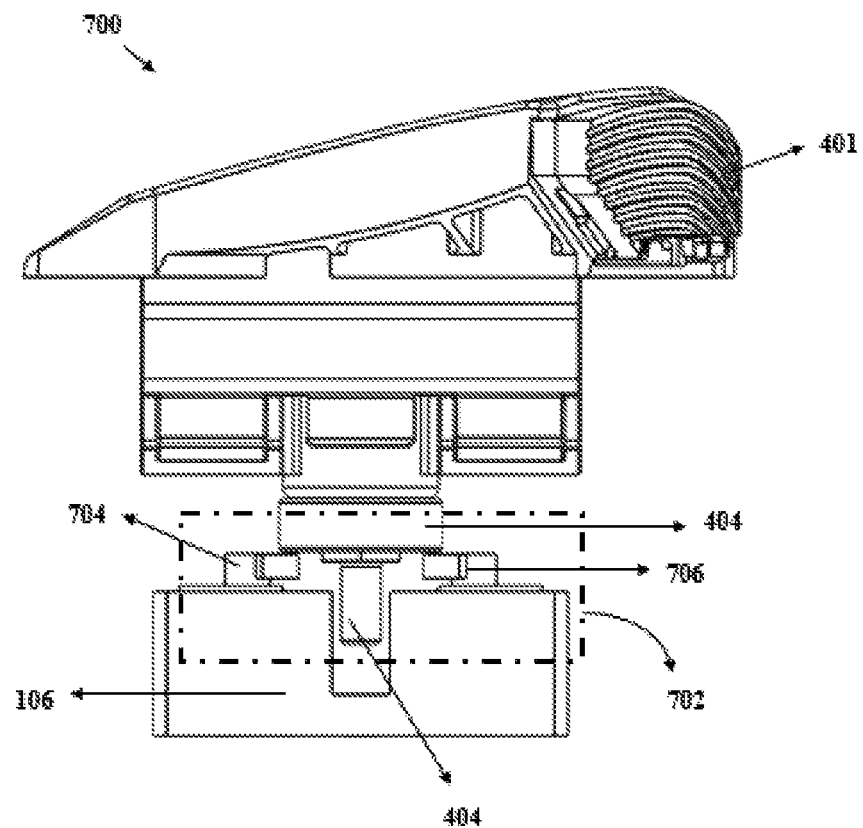
FIG. 7 illustrates a first perspective view of a first state of a fault detection assembly, in accordance with an alternate example embodiment described herein.

FIG. 7 illustrates a first perspective view 700 of a first state of a fault detection assembly 702 of the sortation conveyor (not shown), in accordance with an alternate example embodiment described herein. In some example embodiments, the fault detection assembly 702 can comprise a gate like structure that can define a passage for movement of one or more shoe pins of respective pusher shoes of the sortation system. In some example embodiments, the gate like structure can be formed by a pair of elements positioned at a defined gap. For instance, in some examples, the gate like structure can comprise a first tab 704 and a second tab 706. In some examples, the first tab 704 and the second tab 706 can correspond to contactor springs that can be compressed or stretched about a resting position. In this regard, the contactor springs can be of any material, for example, the contactor springs can be metal contactor springs or non-metal contactor springs, that can be compressed or stretched from a resting position, in response to an external contact made on the contactor springs.

In accordance with said example embodiments, the first tab 704 and the second tab 706 of the fault detection assembly 702 can form an incomplete electric circuit. In this regard, in some examples, the first tab 704 can be connected to a source (i.e. a +V signal end) and the second tab 706 can be connected to a sink (i.e. a 0 Volt end) of a power unit. Further, the power unit can be connected to a processor.

According to some example embodiments, the first tab 704 and the second tab 706 forming the gate like structure can be positioned on the switch plate 102 of the switch assembly 106, in a similar manner, as described in reference to the gate like structure formed by the at least one finger 110 in FIGS. 1-5. In accordance with some example embodiments, the first tab 704 and the second tab 706 forming the gate like structure can be positioned on the switch plate 102 such that, in response to movement of a first shoe pin (i.e. a shoe pin with a bent portion or associated with a shoe bearing with a bent portion) through the passage, the bent portion of the first shoe pin and/or a shoe bearing associated with the first shoe pin, makes a contact with the first tab 704 and the second tab 706, respectively, thereby completing the electric circuit. Further, the gate like structure formed by the first tab 704 and the second tab 706 is such that, a second shoe pin with no bent portion (i.e. of the shoe pin and/or a bearing associated with the shoe pin) passes through the passage defined by the gate like structure, without any portion of the second shoe pin or the bearing associated with the second shoe pin making any contact with any of the first tab 704 and the second tab 706 respectively, thereby leaving the electric circuit incomplete. In other words, in an instance, when a standard (non-misaligned) bearing/pin goes through the passage defined by the first tab 704 and the second tab 706, no portion of contact both sides of the gate like structure (i.e. any portion of the first tab 704 and/or the second tab 706) and the circuit remains incomplete or non-closed, thereby, sending no signal to the processor. However, in an instance, when a misaligned bearing/pin enters the passage, a portion of the bearing and/or the shoe pin completes the electric circuit and sends a signal to the processor. In some example embodiments, the signal can be indicative of a misalignment of the shoe pin. FIG. 7 illustrates the first state of the fault detection assembly 702, in which, the first shoe pin 406 passes through the passage defined by the first tab 704 and the second tab 706. Illustratively, as no portion of the first shoe pin 404 and/or the first shoe bearing 404 is bent or misaligned, the first shoe pin 404 and/or the first shoe bearing 404 passes through the passage without making any contact with any of the first tab 704 and/or the second tab 706.

Figure 8:
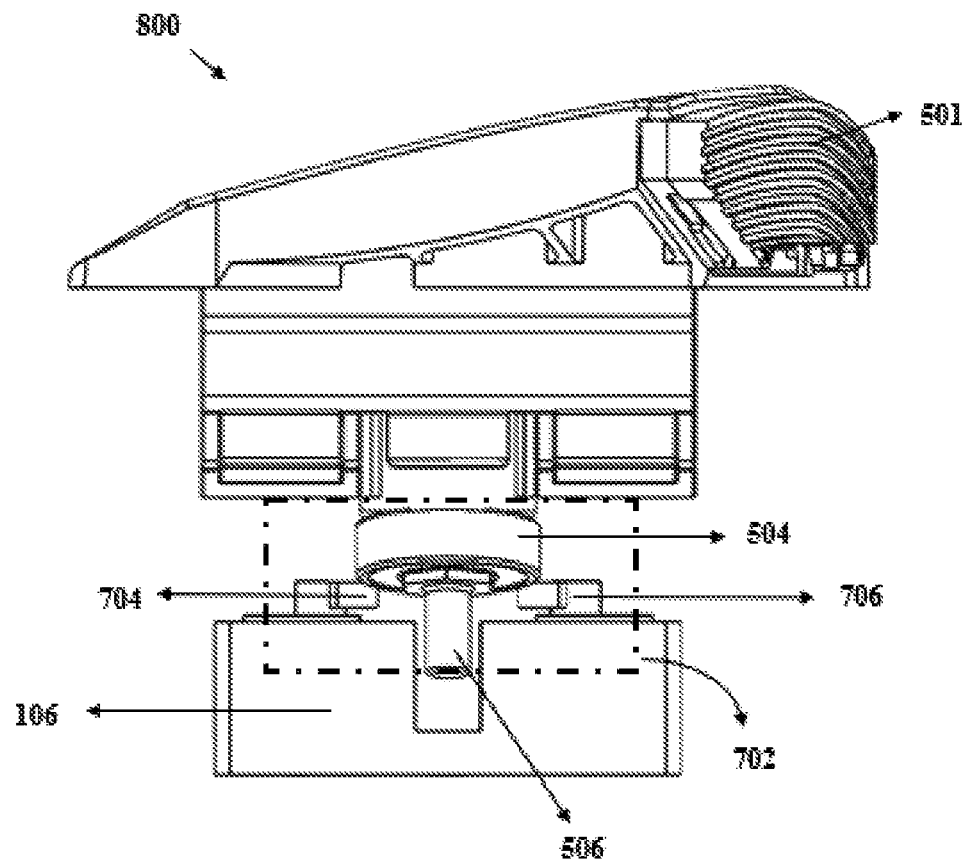
FIG. 8 illustrates a second perspective view of a second state of the fault detection assembly, in accordance with the alternate example embodiment described herein.

FIG. 8 illustrates a second perspective view 800 of a second state of the fault detection assembly 702, in accordance with the alternate example embodiment described herein. In the second state of the fault detection assembly 702, as illustrated, the second shoe bearing 504 associated with the second shoe pin 506 is bent or misaligned. Thus, as the second shoe pin 506 passes through the passage defined between the first tab 704 and the second tab 706, a portion of the second shoe bearing 504 makes a contact with the first tab 704 and the second tab 706. In this regard, in an instance, when the second shoe bearing 504 makes a contact with the first tab 704 and the second tab 706, the electric circuit is completed by the second shoe bearing 504, the first tab 704, and the second tab 706, thereby signaling the processor regarding misalignment or faulty condition of the second shoe pin 506 and/or the shoe bearing 504. In some example embodiments, the processor upon receiving the signal can generate a command to cease operation of the sortation conveyor. Further, in some examples, the processor can also generate an alert indicating a location of comprising the misalignment of the second pusher shoe 501. Further, the processor can also generate a command to move the second pusher shoe 501 at a maintenance location for repairment of the second shoe pin 506 and the second shoe bearing 504.

Figure 9:
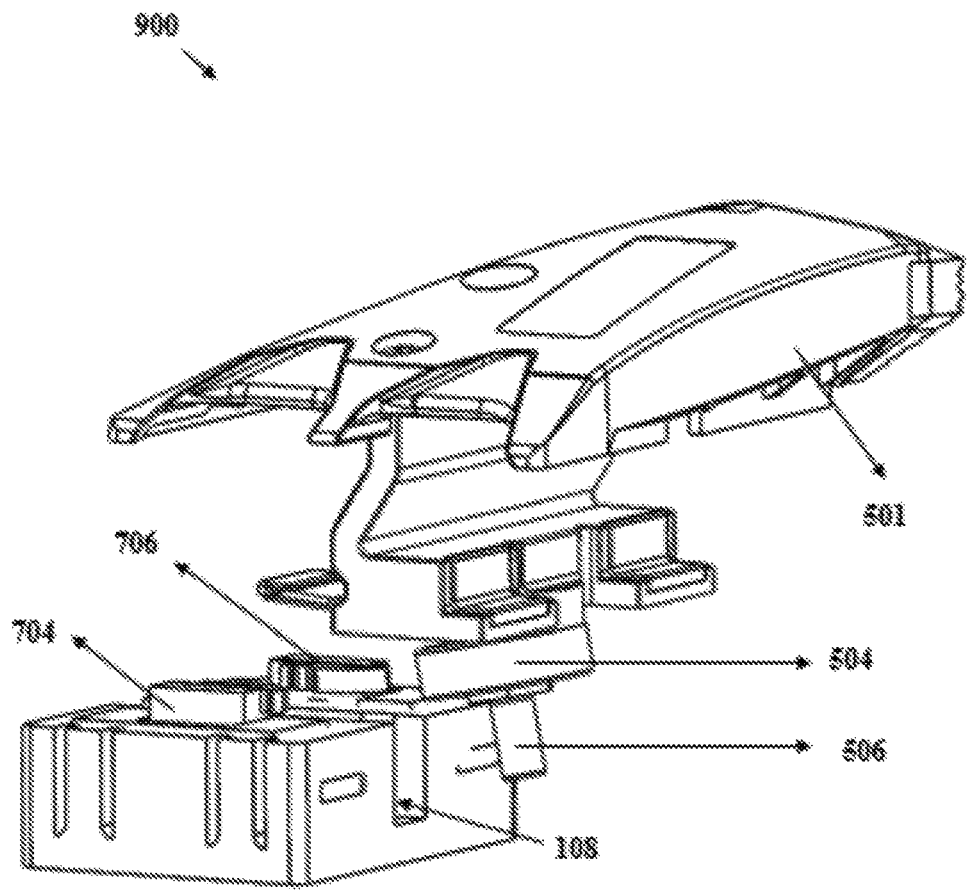
FIGS. 9 and 10 illustrates a fourth and a fifth perspective views of the fault detection assembly, in accordance with the alternate example embodiment described herein.
Figure 10:
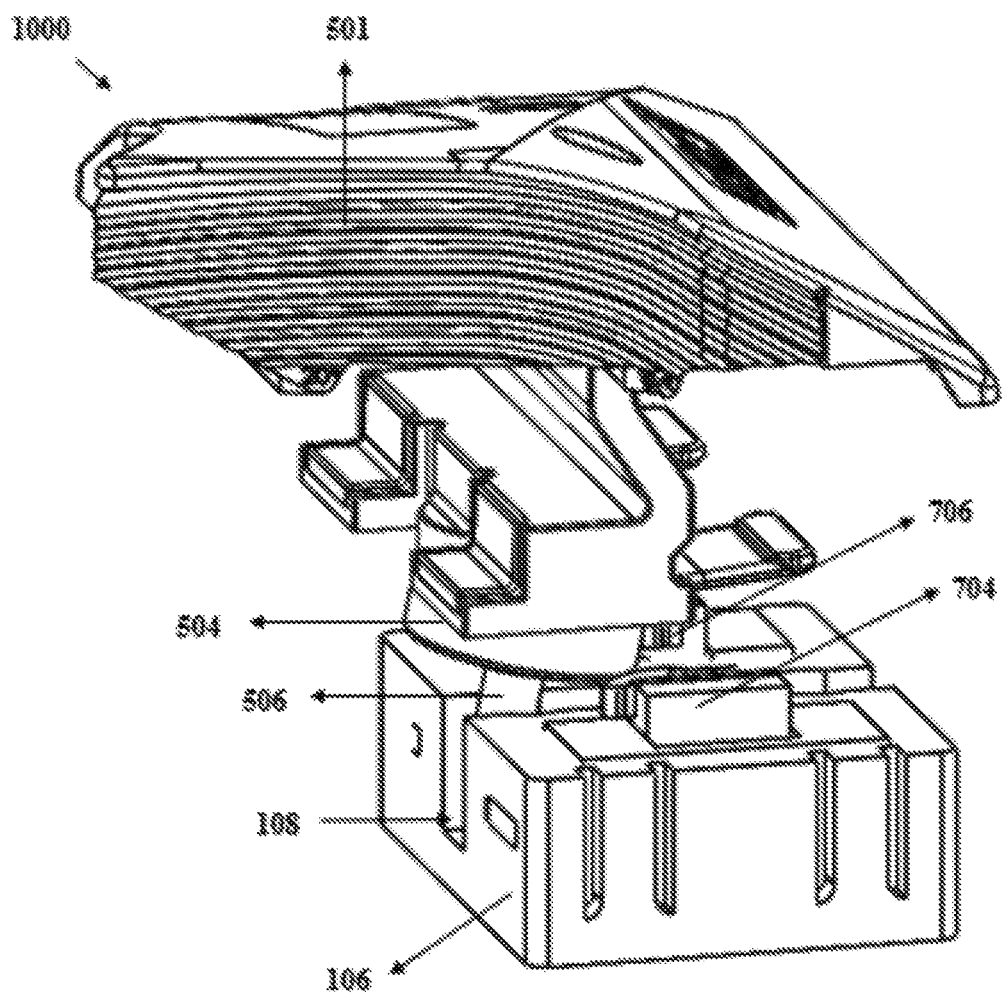

FIGS. 9 and 10 illustrate a third perspective view 900 and a fourth perspective view 1000 of the fault detection assembly 702, in accordance with the alternate example embodiment described herein. The second perspective view 1000 illustrates the second state of the fault detecting assembly 702, as described in reference to FIG. 8.

The term processor referred herein throughout the description can correspond to processor of, for example, but not limited to, a conveyor system, an industrial computer, a distributed network of computing devices, a cloud computing-based platform, an external computer, a standalone computing device, and/or the like. In some example embodiments, the processor can correspond to specially configured field programmable gate array (FPGA), or application specific interface circuit (ASIC), and/or the like. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A shoe sorter comprising:
   a switch plate configured to define a movement path of a shoe pin of a pusher shoe of the shoe sorter;
   a finger mechanically coupled to the switch plate, wherein the finger is configured to be moved in a first direction in response to a first portion of the shoe pin contacting a top portion of the finger; and
   an actuation arm, pivotably engaged to the finger so that a movement of the finger in the first direction causes a movement of the actuation arm in a second direction, wherein the actuation arm in the second direction causes a change in a signal outputted by a photoelectric sensor coupled to the shoe sorter, wherein the change in the signal is used by a processor to determine that the shoe pin is misaligned.

2. The shoe sorter of claim 1, in response to a distal end of the actuation arm being in a first position due to the movement of the actuation arm in the second direction, the photoelectric sensor starts receiving a light previously obstructed by the actuation arm.

3. The shoe sorter of claim 1, wherein the finger is positioned along the movement path defined by the switch plate so that in response to movement of the shoe pin in the movement path, a bent portion of the shoe pin makes a contact with the top portion of the finger.

4. The shoe sorter of claim 1, wherein the finger is positioned along the movement path defined by the switch plate so that upon movement of a second shoe pin in the movement path, a non-bent pin portion of the second shoe pin passes through the movement path along the finger without making a contact with the top portion of the finger.

5. The shoe sorter of claim 1, wherein the processor is configured to generate an alert indicating that the shoe pin is misaligned.

6. The shoe sorter of claim 1, wherein the processor is configured to perform at least one of:
   generating a command to cease operation of the shoe sorter based on determining that the shoe pin is misaligned,
   generate an alert indicating a location of the pusher shoe; and
   generate a command to move the pusher shoe at a maintenance location.

7. The shoe sorter of claim 1, wherein the top portion of the finger is tapered so that in response to the first portion of the shoe pin contacting the top portion of the finger, the finger and the actuation arm pivots about a pivot pin.

8. The shoe sorter of claim 1, wherein the switch plate is configured to define:
   a first movement path for movement of a first set of shoe pins for diverting of a first set of items on the shoe sorter; and
   a second movement path for movement of a second set of shoe pins for non-diverting of a second set of items on the shoe sorter;
   wherein the shoe sorter further comprises:
      a first finger and a first actuation arm, wherein the first finger is configured to be mechanically engaged on the switch plate along the first movement path and pivotably engage to the first actuation arm so that a movement of the finger in the first direction causes a movement of the actuation arm in the second direction; and
      a second finger and a second actuation arm, wherein the second finger is configured to be mechanically engaged on the switch plate along the second movement path and pivotably engage to the second actuation arm so that a movement of the second finger in a third direction causes a movement of the second actuation arm in a fourth direction.

9. The shoe sorter of claim 8, wherein the processor is configured to detect misaligned shoe pins from amongst the first set of shoe pins and the second set of shoe pins by identifying changes in signals outputted by the photoelectric sensor due to the movement of at least one of the first actuation arm and the second actuation arm, respectively.

10. A fault detecting unit configured for detecting a fault in a shoe pin of a shoe sorter comprising:
    a photoelectric sensor;
    a finger configured to be mechanically coupled to a portion of a switch plate of the shoe sorter, wherein the finger is configured to be moved in a first direction in response to a portion of the shoe pin contacting a top portion of the finger; and
    an actuation arm pivotably engaged to the finger so that a movement of the finger in the first direction causes a movement of the actuation arm in a second direction, wherein the actuation arm in the second direction causes a change in a signal outputted by the photoelectric sensor.

11. The fault detecting unit of claim 10, wherein the movement of the actuation arm in the second direction un-obstructs a path of light towards the photoelectric sensor, thereby causing the change in the signal and wherein the change in the signal is indicative of a misalignment of the shoe pin.

12. The fault detecting unit of claim 10, wherein, in response to a distal end of the actuation arm being in a first position due to the movement of the actuation arm in the second direction, a path of light received at the photoelectric sensor is un-obstructed by the actuation arm, thereby, causing the change in the signal outputted by the photoelectric sensor.

13. The fault detecting unit of claim 10, wherein the finger is to be positioned along a movement path defined by the switch plate so that upon movement of a first shoe pin in the movement path, a bent portion of the first shoe pin makes a contact with the top portion of the finger.

14. The fault detecting unit of claim 10, wherein the finger is to be positioned along a movement path defined by the switch plate so that upon movement of a second shoe pin in the movement path, a non-bent portion of the second shoe pin passes through the movement path along the finger without making a contact with the top portion of the finger.

15. The fault detecting unit of claim 10, wherein the top portion of the finger is tapered so that in response to the portion of the shoe pin contacting the top portion of the finger, the finger and the actuation arm pivots about a pivot pin.

16. The fault detecting unit of claim 10, further comprising a spring pin mechanically engaged to the actuation arm and configured to retract back the actuation arm in a direction opposite to the second direction upon movement of the actuation arm in the second direction.

17. A method for detecting a fault in a shoe pin of a shoe sorter comprising:
    initializing a photoelectric sensor of the shoe sorter;
    initiating a movement of the shoe pin along a movement path defined by a switch plate of the shoe sorter; and
    identifying by a processor, a change in a signal value outputted by the photoelectric sensor, wherein the change in the signal value is due to an un-obstruction to light received at the photoelectric sensor caused due to movement of an actuation assembly in response to the shoe pin contacting with a portion of the actuation assembly.

18. The method of claim 17, wherein the actuation assembly comprises:
    a finger mechanically coupled to a portion of a switch plate of the shoe sorter, wherein the finger is configured to be moved in a first direction in response to the shoe pin contacting a portion of the finger; and
    an actuation arm pivotably engaged to the finger so that a movement of the finger in the first direction causes movement of the actuation arm in a second direction, wherein the actuation arm in the second direction causes the un-obstruction to the light received at the photoelectric sensor.

19. The method of claim 17, further comprising generating an alert in response to identification of the change in the signal value wherein the alert is indicative of misalignment of the shoe pin.

20. The method of claim 19, further comprising generating a command to cease operations of the shoe sorter based on determining misalignment of the shoe pin.

\* \* \* \* \*